(12) United States Patent
Kangiser et al.

(10) Patent No.: US 6,446,769 B1
(45) Date of Patent: Sep. 10, 2002

(54) BRAKING APPARATUS FOR A LINEAR MOTOR DRIVEN LOAD

(76) Inventors: Gregory A. Kangiser, 952 Dancing Horse Dr., Colorado Springs, CO (US) 80919; Patrick J. Moreland, 2431 Lafayette Rd., Colorado Springs, CO (US) 80907

( * ) Notice: Subject to any disclaimer, the term of this patent is extended or adjusted under 35 U.S.C. 154(b) by 0 days.

(21) Appl. No.: 09/678,059

(22) Filed: Oct. 2, 2000

(51) Int. Cl.[7] .......................... B65H 59/10; B60T 13/04
(52) U.S. Cl. .................... 188/171; 188/72.2; 188/67
(58) Field of Search .......................... 188/171, 173, 188/72.2, 72.9, 72.1, 72.3, 72.7, 67, 44, 41, 43, 74, 170; 187/288, 376, 350, 369, 223, 375, 370, 367, 351, 359, 266, 377, 250

(56) References Cited

U.S. PATENT DOCUMENTS

| | | | | |
|---|---|---|---|---|
| 3,164,226 A | * | 1/1965 | Lewyckyj | |
| 3,834,496 A | * | 9/1974 | Takeda | |
| 4,515,251 A | * | 5/1985 | Wruk | 188/171 |
| 4,798,269 A | | 1/1989 | Lindner et al. | |
| 5,005,681 A | * | 4/1991 | Pipes | |
| 5,007,505 A | * | 4/1991 | Lindegger | |
| 5,014,828 A | * | 5/1991 | Baldassarre | 188/173 |
| 5,090,522 A | * | 2/1992 | Korff | 188/171 |
| 5,199,532 A | | 4/1993 | Suganuma et al. | |
| 5,234,079 A | * | 8/1993 | Nomura | |
| 5,518,087 A | | 5/1996 | Hwang et al. | |
| 5,671,829 A | * | 9/1997 | Rivera | 188/171 |
| 5,799,757 A | * | 9/1998 | Akamatsu et al. | |
| 5,931,263 A | * | 8/1999 | Ericson et al. | |
| 5,950,773 A | | 9/1999 | Ito | |
| 6,082,506 A | * | 7/2000 | Huang et al. | |
| 6,135,243 A | * | 10/2000 | Kraihanzel | 188/171 |
| 6,216,826 B1 | * | 4/2001 | Botzet | |

* cited by examiner

Primary Examiner—Douglas C. Butler
(74) Attorney, Agent, or Firm—Richard W. Hanes; Hanes & Shutz, P.C.

(57) ABSTRACT

The invention relates to braking apparatus for a linear motor driven load, where the motor comprises a source of electrical energy, a bed having a braking surface, and a load carrying member operably interconnected to the bed for relative movement with respect thereto. The braking apparatus comprises, a brake arm pivotally mounted at its proximal end to the load carrying member. A frictional braking pad is disposed on the distal end of the brake arm in opposing relation to the braking surface on the linear motor's bed. A biasing apparatus, such as a spring, is in contact with the brake arm for pivoting the brake arm with respect to the load carrying member and placing the brake pad of the brake arm in contact with the braking surface on the bed of the linear motor. An electrically responsive solenoid is coupled to the source of electrical energy for overcoming the biasing apparatus during times when electrical power is being supplied to the linear motor.

12 Claims, 5 Drawing Sheets

BRAKING APPARATUS FOR A LINEAR MOTOR DRIVEN LOAD

The present invention generally relates to brakes and more particularly to a fail-safe braking apparatus for a load driven and controlled by a linear motor. When electrical energy is removed from the linear motor that drives the load, the braking apparatus is actuated to prevent the load from responding to the force of gravity or coasting.

BACKGROUND

Rail brake devices for linear motor driven loads are well-known. Generally, these types of brakes employ brake pad carrying caliper arms that apply opposed clamping forces to both sides of a linear braking rail upon being activated by a spring or an electromagnetic device. Such an apparatus is shown in U.S. Pat. No. 5,518,087 to Sang Y. Hwang for *Rail Brake Apparatus for a Linear Motor Elevator*.

Another prior art type of brake for a linear motor driven load is disclosed in U.S. Pat. No. 5,950,773 to Osamu Ito for *Braking Apparatus For A Linear Motion Guiding Apparatus*. Ito discloses a pair of mutually opposed braking pads 58 and 59 that clamp onto both sides of a steel belt 63 in order to provide braking for the load. A pair of linkages moves the braking pads into and out of engagement with the steel belt. In normal operation, a piezoelectric actuator is energized with an electric voltage to cause bending of a linkage. The distortion of the linkage removes braking pressure from the clamping brake pads. Loss of electrical voltage removes the elongating force provided by the piezoelectric actuator, allowing the restorative force of the bent linkage to move the brake pads into clamping engagement with the steel belt.

In the aforementioned patented apparatus, as well as in other forms of linear motor braking devices, the braking force is applied through an external means such as the restorative force of the distorted linkages of Ito or the electromagnetic force of the device shown in the Hwang patent. Other conventional means of preventing a vertically oriented linear motor load from falling include pulley/cable and counterweight systems and pneumatic balancing devices. In all such apparatus the applied braking forces must be commensurate with the mass of the load to which the braking action must be applied.

It is, therefore, the primary object of the present invention to provide a fail-safe brake for a linear motor driven load that will be activated upon failure of the electrical power to the linear motor.

A second and significant object of the present invention is to provide a self-actuating brake that does not require externally applied forces to implement the braking function.

A third object of the invention is to provide a self-actuating brake that minimizes any required spring force and maximizes the braking force, thereby keeping the brake small, relative to load size, simple and easy to maintain or replace.

Another object of the invention is to provide a braking apparatus for a linear electric motor driven load that will stop any further movement of the load, either by virtue of the load's coasting or as a result of gravitational pull, once electric power to the linear motor has failed.

A still further object of the invention is to provide a brake for a linear motor that requires only a very minimum of electrically activated force to restrain the braking apparatus from braking action during periods when electrical power is available and the load is under the motor's control.

Another object of the invention is to provide a brake for a linear motor that, by slight variations in the design of the geometry of the brake and/or the materials of the respective braking surfaces, can be made to provide a quick sudden stop of the load or a slow soft stop.

These and other objects, features and advantages of the present invention will become apparent upon a reading of the following summary and detailed description of the invention.

SUMMARY OF THE INVENTION

The braking apparatus of the present invention is functional to stop the gravitationally motivated movement or the coasting motion of a load carrying member that is movable on the bed of a linear motor. The load is moved and controlled by the linear motor, the armature coils and field magnet for which are respectively coupled to either the load carrying member or the bed. When electrical power to the linear motor is removed or fails it is important that the load be stopped and not allowed to free fall or coast, with respect to the bed. This is especially true when the load carrying member moves in a vertical or angular direction, but also when the load travels horizontally.

Accordingly, the present invention provides a self-actuating brake for the load carrying member that functions immediately upon power failure to the linear motor to stop the load carrying member. The geometry of the braking arm and the principle of its operation allow the size of the brake to be disproportionately small compared to the mass of the load.

Similar in its basic operation to that of a pivotally mounted door stop, the load brake of the present invention comprises a brake arm having a brake pad at one of its ends and at its other end a pivotal attachment to the linear motor's load, or load carrying member. To urge the brake pad into initial engagement with a braking surface that is integral with the motor's bed, the brake arm is lightly spring loaded. In normal operation, when electric power is being supplied to the linear motor and the load is under control, the brake pad is held out of engagement with the braking surface by an electrically operated solenoid. The solenoid is operated from the same electrical source that supplies energy to the linear motor. When electrical power fails, or is removed from the linear motor, the solenoid is also deenergized, releasing the brake arm and allowing spring biasing pressure to bring the brake pad into engagement with the bed's braking surface.

Once the brake pad makes contact with the braking surface, the brake pad is frictionally pulled, by the movement of the load, into greater and greater binding engagement with the braking surface. The rate of load deceleration, that is, whether the stop is substantially sudden or whether it is a "soft" stop is determined by the geometry of the brake arm and the material chosen for the brake pad. The elements of geometry that effect deceleration include the angle of the brake arm with respect to the braking surface and the relative location of the brake arm pivot point. The type of material used for the brake pad and its hardness also effects the rate of deceleration.

A brake arm and brake pad, in accordance with the present invention, eliminate the need for large external forces to apply braking pressure against the bed's braking surface or for large solenoids to restrain the brake arm against large spring braking forces during normal operation. The inventive construction allows the braking mechanism to be compact and inexpensive. Because the brake works against only one side of the bed's braking surface, removal and replacement of the brake apparatus is facilitated.

DETAILED DESCRIPTION OF THE INVENTION

Figure 1:
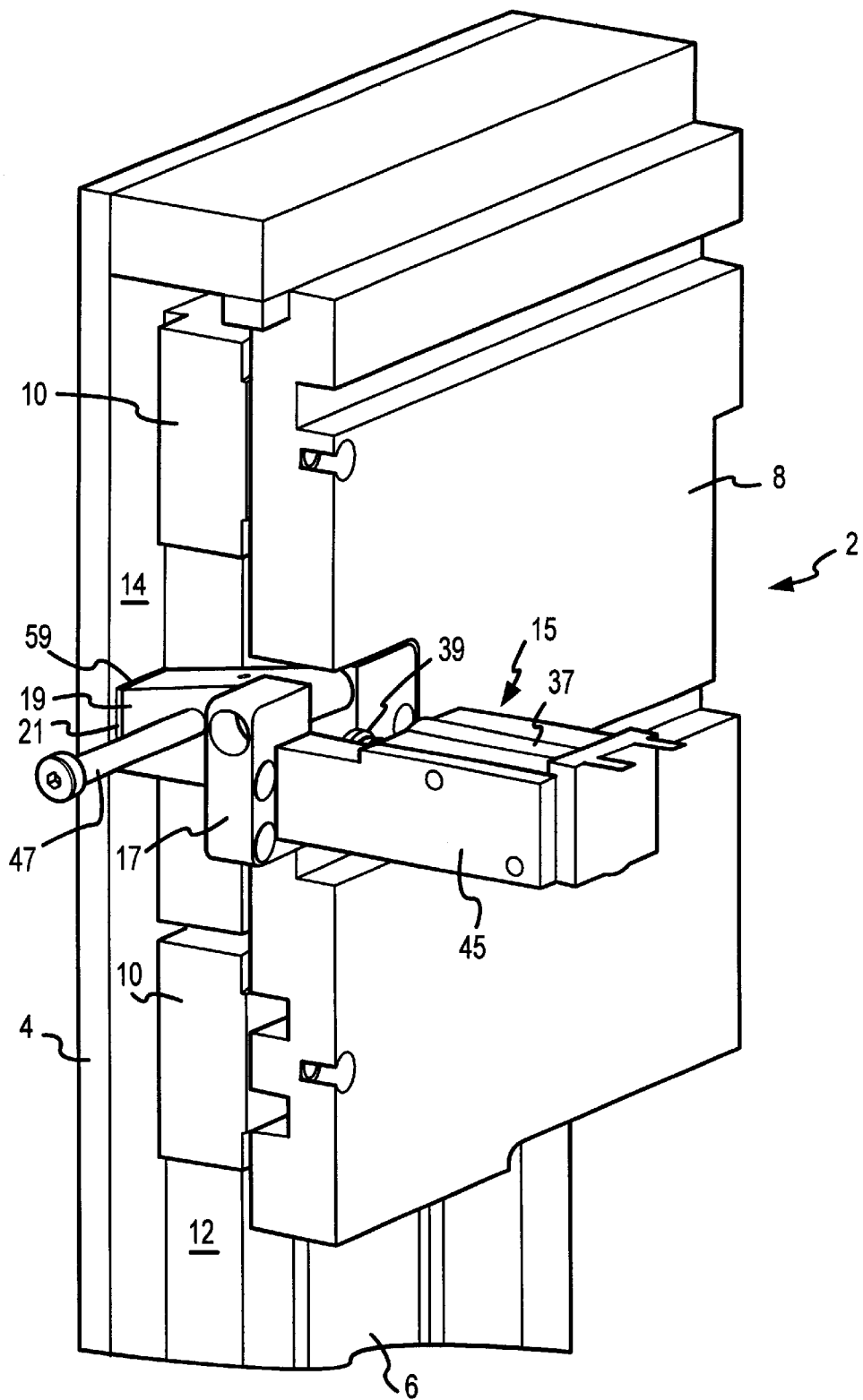
FIG. 1 is a fragmentary perspective view of a typical vertically moving linear motor, showing the bed, the load carrying plate that is slidably movable on the bed and the braking mechanism of the present invention attached to the plate.

Referring first to FIG. 1, a typical linear motor 2 is illustrated. A longitudinally extending, vertically oriented base, or bed, 4 carries the motor field magnet 6. The load (not shown) is mounted on a load carrying plate 8 that is slidably mounted on the bed 4. The armature coils that are carried by the plate 8 are not shown, such construction being conventional in the field of linear motors. It will be apparent to those skilled in the art that the armature coils and field magnet can be reversed in their positioning, that is, the field magnet can be associated with the load carrying plate 8 and the armature coils can be integrated with the bed 4.

Plate bearings 10 engage a cooperative bearing 12 located on both sides of the bed 4. A flat braking surface 14 is provided as a structural part of the bed.

Figure 6:
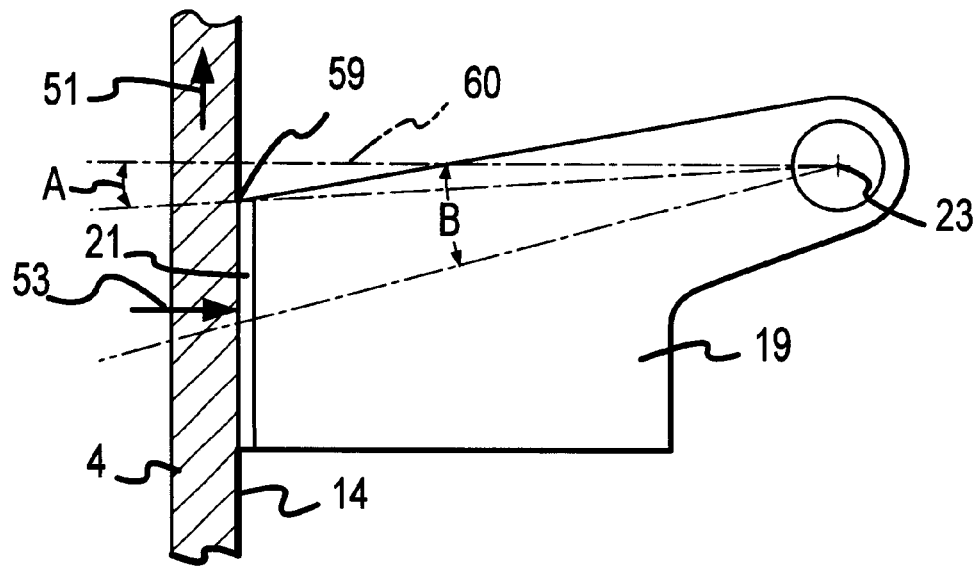
FIG. 6 is a view similar to that of FIG. 5 except that it illustrates the position of the brake arm when the brake pad is fully engaged with the braking surface.

The braking apparatus 15 of the present invention is attached to the load carrying plate 8 by a mounting bracket 17. A brake arm 19 is pivotally attached at its proximal end to the mounting bracket 17. Attached to the other, or distal, end of the brake arm 19 is a rectangularly shaped brake pad 21 positioned for ultimate surface-to-surface engagement with the braking surface 14 of the bed 4 (as shown in FIG. 6).

Figure 2:
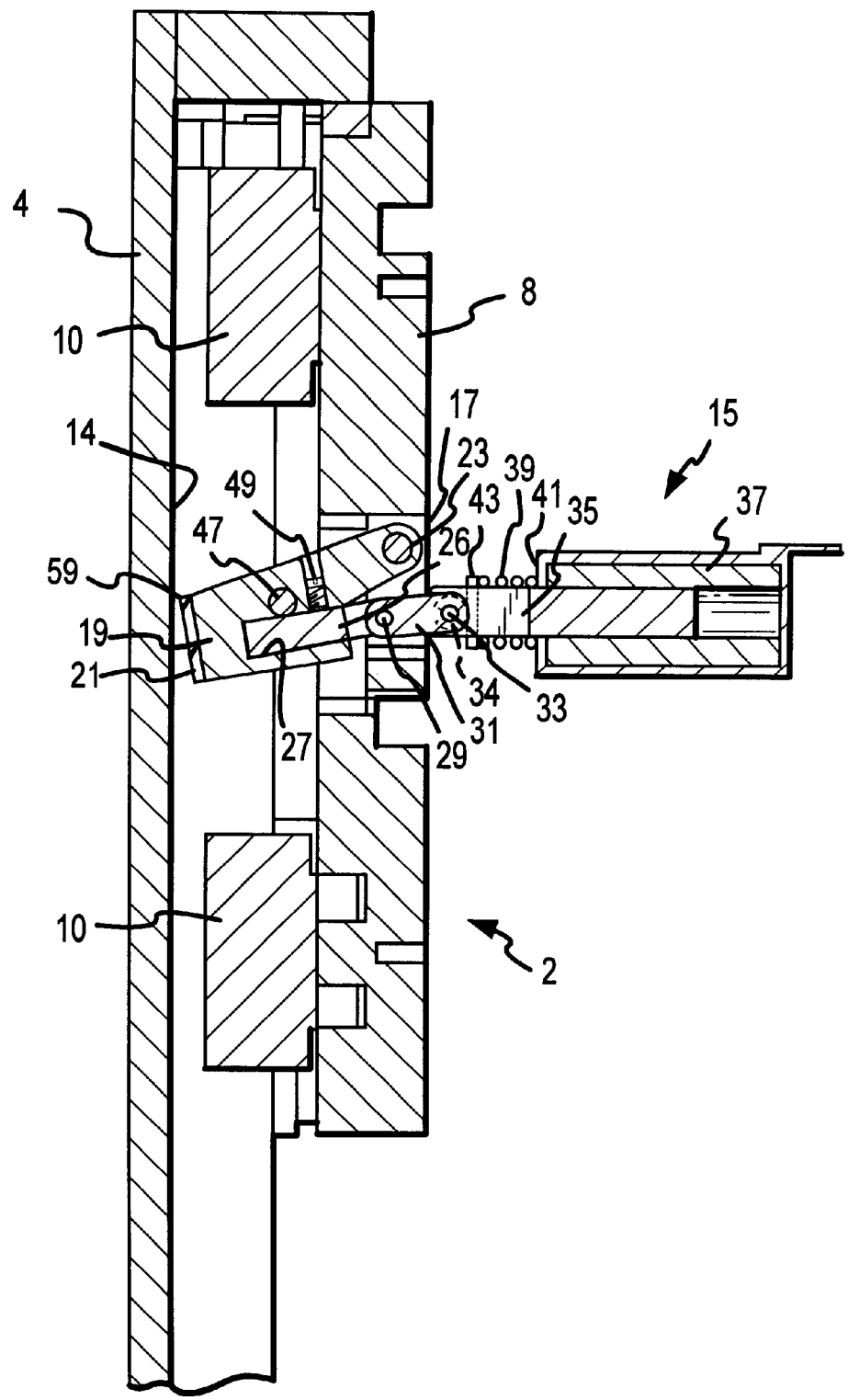
FIG. 2 is a vertical cross section of the apparatus shown in FIG. 1. The braking arm is shown in the position consistent with normal operation of the linear motor, that is the brake pad is disengaged from the bed's braking surface.
Figure 3:
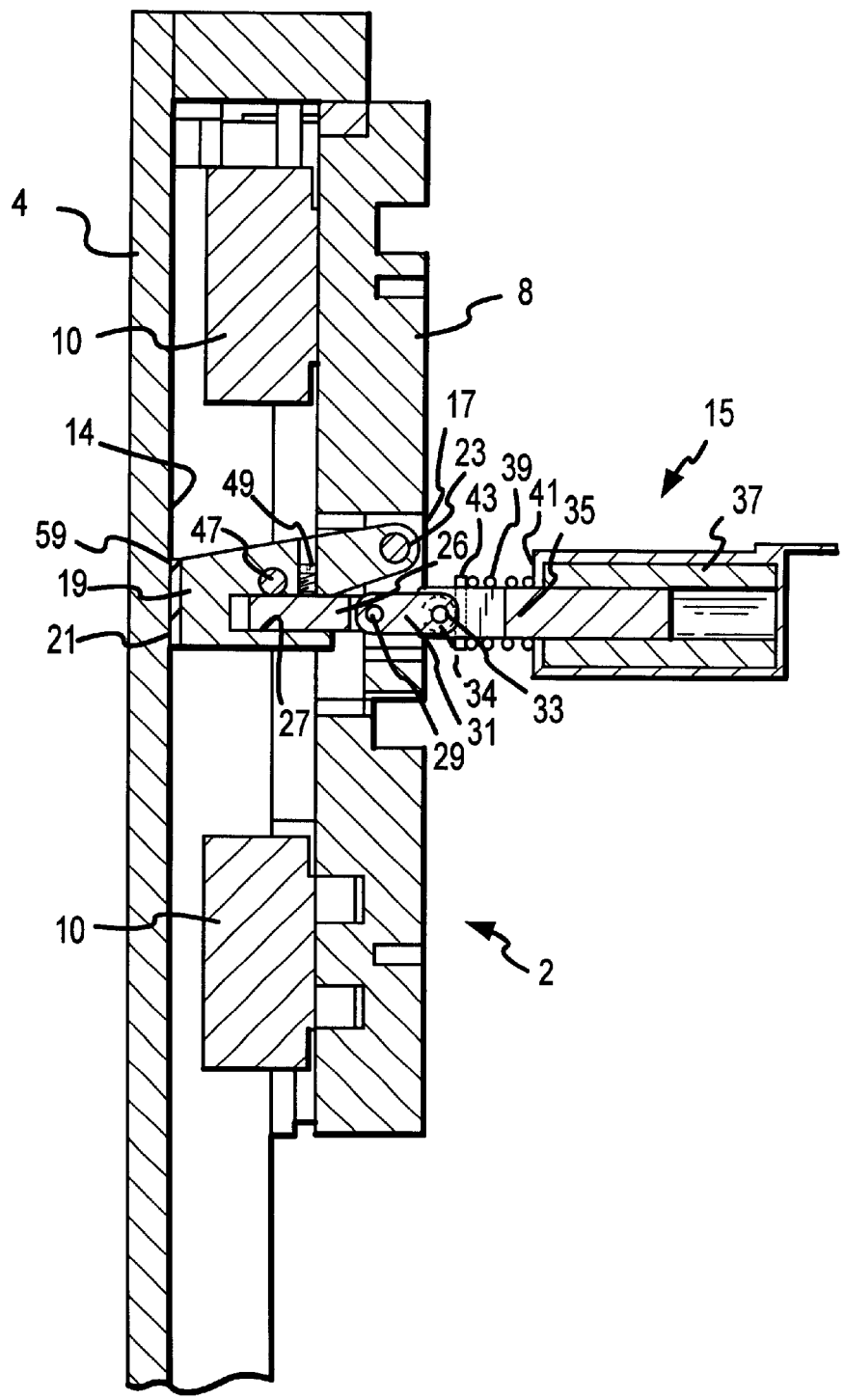
FIG. 3 is a similar vertical cross section to that of FIG. 2. The braking arm is shown in its braking position, consistent with failure of electrical power to the linear motor, that is the brake pad is engaged with the bed's braking surface.
Figure 4:
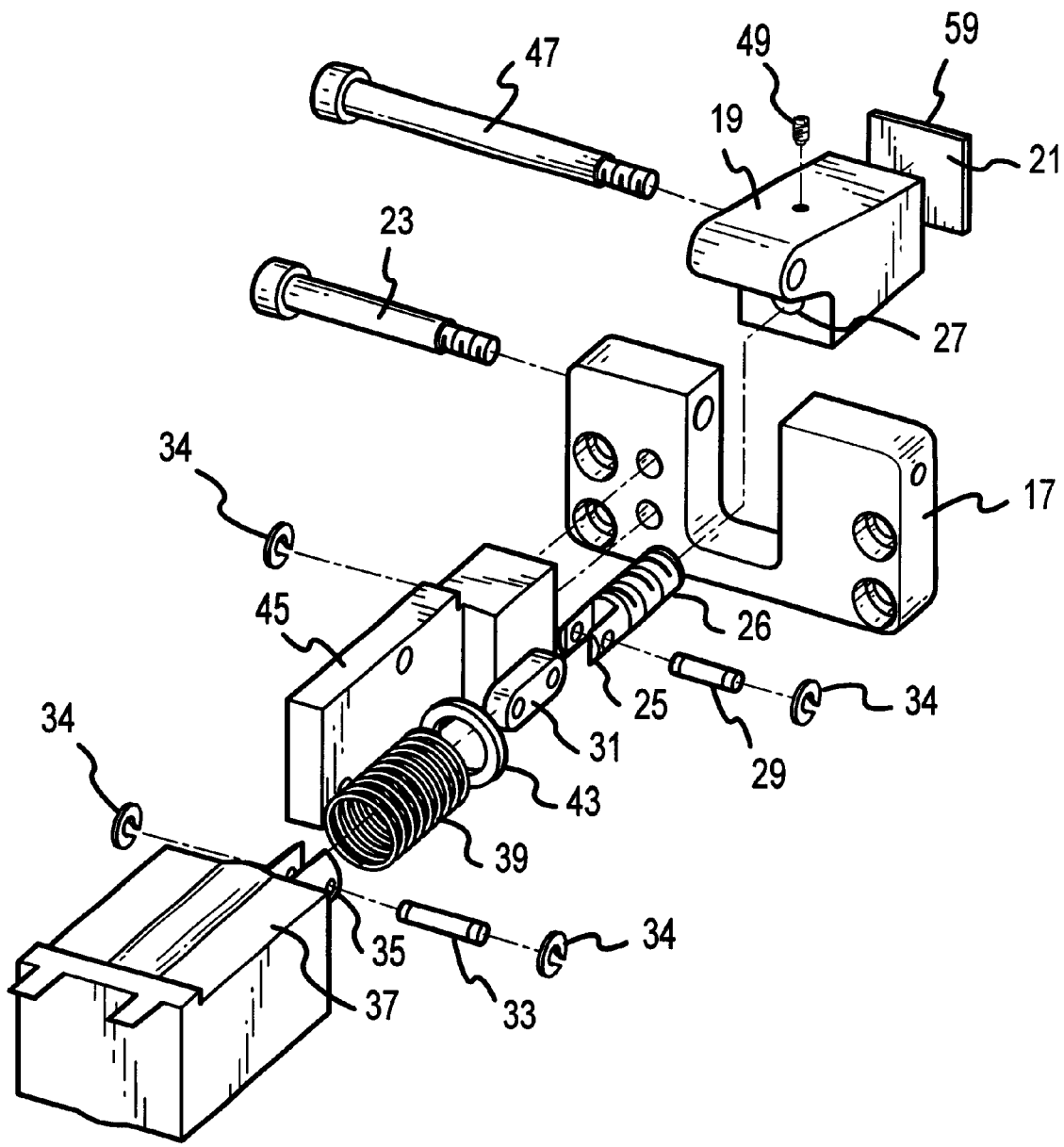
FIG. 4 is a perspective exploded view of the braking apparatus of the present invention, except the braking surface is not shown.

For details of the braking apparatus 15, reference is now made to FIGS. 2–4. The braking arm 19 is pivotally interconnected to the mounting bracket 17 by a cylindrical pivot pin 23. A clevis 25 having a threaded end 26 engages a threaded bore 27 in the braking arm 19. A clevis pin 29 pivotally interconnects the clevis 25 with one end of a linking member 31, the other end of which is pivotally attached by a pin 33 to the clevis forming end of the reciprocally movable shaft 35 of an electrically operated solenoid 37. A helical spring 39 surrounds the exposed end of the solenoid shaft 35. One end of the spring abuts a flat end surface 41 of the solenoid 37. The other end of the spring 39 abuts the solenoid facing surface of a washer 43 that also surrounds the end of the solenoid shaft 35 and whose opposing surface bears against the retaining "C" springs 34 that attach to each of the protruding ends of the coupling pin 33. The light expanding force of the spring 39 normally biases the pin 33 and the linking member 31 toward the braking surface 14. This force urges the braking arm 19 to pivot upwardly about its pivot point 23 into a position where the brake pad 21 engages the braking surface 14, as shown in FIG. 6.

Figure 5:
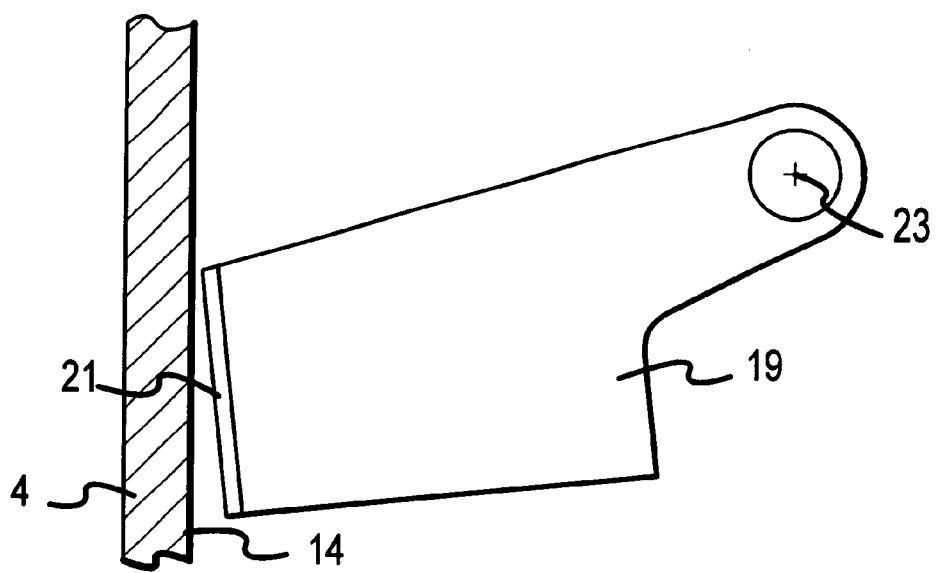
FIG. 5 is a diagrammatic side view, with the brake arm in its normal non-braking position with electrical power on. The brake pad is shown positioned a slight distance from the braking surface.

However, when the solenoid 37 is electrically energized from a source of electric power (not shown) that is common with the source that operates the linear motor 2, the solenoid shaft 35 is withdrawn into the solenoid body. As the solenoid shaft 35 is withdrawn, it brings with it the pin 33 and the "C" springs 34, causing the helical spring 39 to compress. Withdrawal of the solenoid shaft causes the braking arm 19 to pivot downwardly about its point of rotation 23 into the position of brake disengagement, as shown in FIGS. 2 and 5. The downwardly pivoted position of the brake arm 19 maintains the brake pad 21 out of engagement with the braking surface 14.

A block 45 serves as a mounting base for the solenoid 37 and provides the required spacing between the solenoid and the mounting bracket 17. A laterally extending arm provides a handle 47 for manually pulling the braking arm downwardly, away from engagement with the braking surface 14, to disengaging the brake. A set screw 49 threadingly engages the top of the braking arm to contact the end of the manual handle 47 and secure it in place within the brake arm 19.

In operation, when electrical power is disconnected from both the linear motor 2 and the solenoid 37, the light biasing force of the spring 39 urges the linking member 31 forward toward the braking surface 14. This force causes the braking arm to pivot upwardly about the pivot point 23, going from the position of disengagement, shown in FIGS. 2 and 5, into the position shown in FIG. 6.

After initial contact between the brake pad 21 and the braking surface 14, the relative movement between the braking surface and the downwardly moving brake pad produces a frictional force therebetween, depicted by the force arrow 51 in FIG. 6. This frictional force tends to rotate the braking arm 19 about its pivot point 23, thereby increasing the reaction force 53 on the brake pad. This increase in force 53 produces a corresponding increase in frictional force 51, thereby producing the self-energizing behavior of the brake. As the frictional force 51 increases, it quickly becomes sufficient to stop further movement of the load carrying member, relative to the bed 4.

To release the brake before electrical power is restored, the braking arm 19 is manually rotated about its pivot point by use of the handle 47. The brake arm is moved in a direction that will tend to disengage the brake pad from the braking surface. Simultaneously with manually pulling the handle 47, the load itself is manually or mechanically lifted or moved in a direction opposite to that of the direction of movement that was stopped by the brake.

To release the brake after electrical power is restored, the load is caused to move in the direction of force arrow 51 through the thrust force of the linear motor. This movement will cause the brake arm to rotate out of engagement with the braking surface and allow the small solenoid force to further rotate the brake arm and retract the brake pad from the braking surface back into the position shown in FIGS. 2 and 5. The brake cannot be released manually or electrically without causing the load to move in the direction of the force arrow 51.

Although the preferred embodiment of the invention includes the spring 39 as the biasing means to establish initial contact between the brake pad and the braking surface, other biasing means can be employed. For example, the brake arm 19 could be provided with a counterweight that is normally held in a neutral position by an electrical solenoid, such as the solenoid 37 of the preferred embodiment. When the counterweight is released from its neutral position by the de-energizing of the solenoid it reacts by swinging the brake arm about its pivot point 23 to thus establish initial contact between the pad 21 and the braking surface 14. Spring biasing arrangements other than the specific one described herein could also be designed by those skilled in the art.

In order to achieve the advantages of the self-actuating brake, the geometry of the braking arm and the material of the braking pad must be such that when the brake pad first contacts the braking surface the subsequent rate of increased frictional contact with the braking surface will provide the desired rate of load deceleration. To achieve maximum braking efficiency the angle A, shown in FIG. 6, should be minimal, although the angle must be great enough that the top edge 59 of the brake pad 21 must lie below a line 60 that is perpendicular to the braking surface and passes through the center of the pivot point 23. In the preferred embodiment a high rate of deceleration is desired, causing a relatively sudden stop of the load. In such case angle A is 3.24° while angle B, also shown in FIG. 6, is 15.84°. Angle B is the angle between horizontal line 60 and a line between the center of the brake pad 21 and the pivot point 23.

In the preferred embodiment, where the load is approximately 30 pounds moving at a maximum speed of 30 inches per second, the brake pad 21 is constructed of neoprene rubber having a hardness of shore 50A durometer. The brake pad is approximately 1/16 of an inch thick and three quarters of an inch square. Preferably, the distance between the top edge 59 of the brake pad 21 and the braking surface 14, when the solenoid 37 is energized and the brake is not engaged, is approximately one millimeter.

The softer the brake pad material and the smaller the angle A, the more sudden is the stop of the load. Conversely, as the angle A becomes larger and the material of the brake pad is made harder, a softer stop will be achieved. However, for the combination of brake pad material and the brake arm geometry described herein for the preferred embodiment, if the angle A exceeds about 4° there will be insufficient friction established between the braking surface 14 and the brake pad 21 to effectively stop the load. As shown by the example of the preferred embodiment, the rate of deceleration for a given size and speed of load will ultimately depend on the selection of brake pad material, the angles A and B of the brake arm and the relative smoothness or roughness of the bed's braking surface.

We claim:

1. Braking apparatus for a linear motor driven load, where a motor comprises a source of electrical energy, a bed having a braking surface, and a load carrying member operably interconnected to the bed for relative movement with respect thereto, said braking apparatus comprising in combination,
    a brake arm having distal and proximal ends and pivotally mounted at its proximal end on the load carrying member for pivoting in a plane parallel to a direction of movement of the linear motor driven load,
    a frictional surface disposed on the distal end of the brake arm in opposing relation to the braking surface of the bed,
    biasing means in contact with the brake arm for pivoting the brake arm with respect to the load carrying member, and
    electrically responsive means coupled to the said electrical energy for overcoming the biasing means.

2. The combination of claim 1 where the biasing means in contact with the brake arm is a spring.

3. The combination of claim 1 where the electrically responsive means is a solenoid having a body and a reciprocally movable shaft pivotally interconnected to the brake arm.

4. The combination of claim 1 where the brake arm is angularly disposed with respect to the braking surface.

5. The combination of claim 3 where the pivotal interconnection between the brake arm and the shaft includes,
    a clevis connected to the brake arm, and
    a linkage pivotally interconnecting the clevis and the solenoid shaft.

6. The combination of claim 5 where the biasing means is a spring surrounding the solenoid shaft and disposed between the solenoid body and the linkage.

7. The combination of claim 1 where the brake arm includes a transverse bore therein and a pin disposed within the bore, the longitudinal center line of which forms an axis of rotation of the brake arm.

8. The combination of claim 7 where the brake pad is disposed below a plane that is perpendicular to the braking surface and which passes through the axis of brake arm rotation.

9. A braking apparatus for a load configured to be operably interconnected to a braking surface for relative movement with respect thereto, the braking apparatus comprising:
    a brake arm pivotally interconnected to a load carrying member for pivoting in a plane parallel to a direction of movement of the load,
    means biasing the brake arm for pivotal movement,
    electrically responsive means for overcoming the biasing means.

10. The combination of claim 9 where the electrically responsive means includes an electrical solenoid having a reciprocally moveable shaft and having means interconnecting the shaft with the brake arm.

11. The combination of claim 10 where the brake arm includes a frictional braking pad.

12. The combination of claim 11 where the biasing means includes at least one spring.

* * * * *